(12) United States Patent
Chen et al.

(10) Patent No.: US 8,297,765 B2
(45) Date of Patent: Oct. 30, 2012

(54) MICROSTRUCTURAL POLARIZED LIGHT-GUIDE DEVICE

(75) Inventors: Cheng-Huan Chen, Hsinchu (TW);
 Cheng-Kuo Sung, Hsinchu (TW);
 Chien-Chuan Chen, Hsinchu (TW);
 Chia-Meng Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 576 days.

(21) Appl. No.: 12/629,873

(22) Filed: Dec. 2, 2009

(65) Prior Publication Data

US 2010/0165598 A1 Jul. 1, 2010

(30) Foreign Application Priority Data

Dec. 31, 2008 (TW) ................................ 97151792 A

(51) Int. Cl.
 *F21V 9/14* (2006.01)
(52) U.S. Cl. ........... 362/19; 362/615; 362/627; 362/629
(58) Field of Classification Search ............... 362/19, 362/600, 612, 614, 615, 627, 629; 349/96
 See application file for complete search history.

(56) References Cited

U.S. PATENT DOCUMENTS

2006/0001797 A1* 1/2006 Allen et al. ................. 349/96

\* cited by examiner

*Primary Examiner* — Meghan Dunwiddie

(57) ABSTRACT

A microstructural polarized light-guide device comprises an unpolarized light source module, a subwavelength polarization beam splitter structure and a polarization conversion module, the unpolarized light source module comprises a light-guide plate and a light source at the edge of the light-guide plate, the material of the light-guide plate is PMMA with the characteristic of high transparency, the surface of the light-guide plate has a plurality of extraction patterns, the polarization beam splitter structure is a nano-scale structure and comprises a dielectric nanograting layer and a metallic nanograting layer, and the dielectric nanograting layer and the metallic nanograting layer are vertically stacked with each other, the dielectric nanograting layer is integrated with a surface opposite to the surface with the plurality of extraction patterns, the polarization conversion module is disposed on the surface with the plurality of extraction patterns of the light-guide plate.

12 Claims, 5 Drawing Sheets

MICROSTRUCTURAL POLARIZED LIGHT-GUIDE DEVICE

CROSS-REFERENCE TO RELATED APPLICATION

This application claims foreign priority from a Taiwan Patent Application, Ser. No. 097151792, filed on Dec. 31, 2008.

BACKGROUND OF THE INVENTION

1. Field of the Invention

The present invention generally relates to a microstructural polarized light-guide device, more particularly, a nano-scale light-guide device which is composed of subwavelength polarization beam splitter structure, polarization conversion module, and light-guide module.

2. Description of the Prior Art

With reference to FIG. 1, which illustrates a side view showing a conventional back light structure. As shown in the figure, a back light module 1 mainly comprises an incident CCFL (cold cathode fluorescent lamp) 10, a reflection shade 9, a light-guide plate 7, a reflection plate 5, a diffusion plate 11, a prism plate 12A, a prism plate 12B, and an absorbing polarizer 13. Light emitted by the CCFL 10 or reflected by the reflection shade 9 may directly or indirectly enter into the light-guide plate 7 for propagation. Light passing through an optical-designed structure located at the lower portion of the light-guide plate 7 and reflected by the reflection plate 5 is interfered. Continuously, the light is diffusely emitted with a certain angle to the light-guide plate 7 and averagely distributed on a lighting area. Then the diffusion plate 11, the prism plate 12A and the prism plate 12B adjust the emergence angle of the light so as to let the emergence direction of the light be vertical to the absorbing polarizer 13. Before the light entering into a liquid crystal layer, the light is polarized by the absorbing polarizer 13, and the energy of the light is then decreased about 50%. So that the usage to the light is not expectable.

For all elements, the light-guide plate 7 is a propagation media of the back light module 1. The shapes and optical structures of the light-guide plate 7 are the solutions to the brilliance of a emergence surface and the distribution performance of the emergence light. Due to that of polarized light being effectively used by an LCD and a light-guide device being with the function of polarization, the light absorbed by the absorbing polarizer 13 can be recycled in order to promote the usage of light. Further, light can be concentrated to emit, and the direction of the emergence light is almost vertical to the absorbing polarizer 13.

In addition, while the application range of the TFT color LCD is being increased, the volumes of the TFT color LCD and the related consumer electronic products are being slim, and the advantages of the TFT color LCD, such as high illumination, uniformity and wide-angle, are being achieved, many different fields are doing their best to developing the back light system in order to make it step into a further stage.

According to ROC Patent No. I266117 of a back light module with polarized light conversion function, a light-guide plate is disposed on a phase retarder, comprising a plurality of microstructures on the surface. The light source is placed at the edge of the light-guide plate, light is extracted by the microstructural surface of the light-guide plate. In addition, a plurality of strip-shaped subwavelength gratings are disposed on the light-guide plate to allow P-polarized light to emerge from the light-guide plate and allow S-polarized light to be recycled.

S-polarized light is reflected through a reflector sheet on the bottom of the back light module and is converted into P-polarized light by passing through the phase retarder twice, to pass through the subwavelength gratings. The prior art recycles S-polarized light to improve the TFT LCD display efficiency, in addition, enable a more light-weighted back light module by applying the plurality of strip-shaped subwavelength grating structure.

To meet the light-weight and energy saving LCD for consumers, and to achieve more simple and efficient production processing, the present invention provides a microstructural polarized light-guide device, i.e., a nano-scale polarization beam splitter structure and a polarization conversion module, in order to improve the optical efficiency of the back light module by re-utilizing reflected polarized light beams. The invention, therefore, is a light-weighted device with lower energy consumption.

SUMMARY OF THE INVENTION

In view of the aforementioned disadvantages and problems of the prior art, the primary objective of the present invention is to provide a microstructural polarized light-guide device, more particularly, a nano-scale light-guide device which is composed of a subwavelength polarization beam splitter structure, a polarization conversion module, and a light-guide module, so as to transform an unpolarized light into a polarized light through the microstructural polarization beam splitter structure and the polarization conversion module.

The present invention relates to a microstructural polarized light-guide device, comprising an unpolarized light source module, a subwavelength polarization beam splitter structure and a polarization conversion module; the unpolarized light source module comprises a light-guide plate and a light source at the edge of the light-guide plate; the light-guide plate is PMMA with the characteristic of high transparency, the surface of the light-guide plate has a plurality of extraction patterns, in addition, the surface is either a tilt plane or a flat plane; the light source is set at the edge of the light-guide plate and is either a cold cathode fluorescent lamp (CCFL) or a light emitting diode (LED).

The subwavelength polarization beam splitter structure is a nano-scale structure, further comprising a dielectric nanograting layer and a metallic nanograting layer; the dielectric nanograting layer is a strip-shaped structure and integrated with the light-guide plate on a surface opposite to the surface of the light-guide plate, both of the dielectric nanograting layer and the light-guide plate are made of either PMMA, materials or glass with the characteristic of high transparency; the metallic nanograting layer is formed on the dielectric nanograting layer and is vertically stacked with the dielectric nanograting layer, the metallic nanograting layer is composed of metal, such as aluminum, gold, silver, copper or tungsten.

The polarization conversion module is disposed on the surface of the light-guide plate, which comprises a plurality of extraction patterns; the polarization conversion module is composed of a polarization converter element and a reflective film, the polarization converter element is attached to the surface with the plurality of extraction patterns of the light-guide plate and is a nano-scale dielectric structure or an optical phase retarder; the reflective film coating is disposed on the external surface of the polarization converter element.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

The present invention provides a microstructural polarized light-guide device, particularly, a nano-scale polarization beam splitter structure and a polarization conversion module; the light-guide device enables an unpolarized light to be transformed into a polarized light wave by using the microstructural polarization beam splitter structure and the polarization conversion module, therefore a polarized light wave is obtained with low absorption. The invention will become apparent in the following description taken in conjunction with the following drawings.

Figure 1:
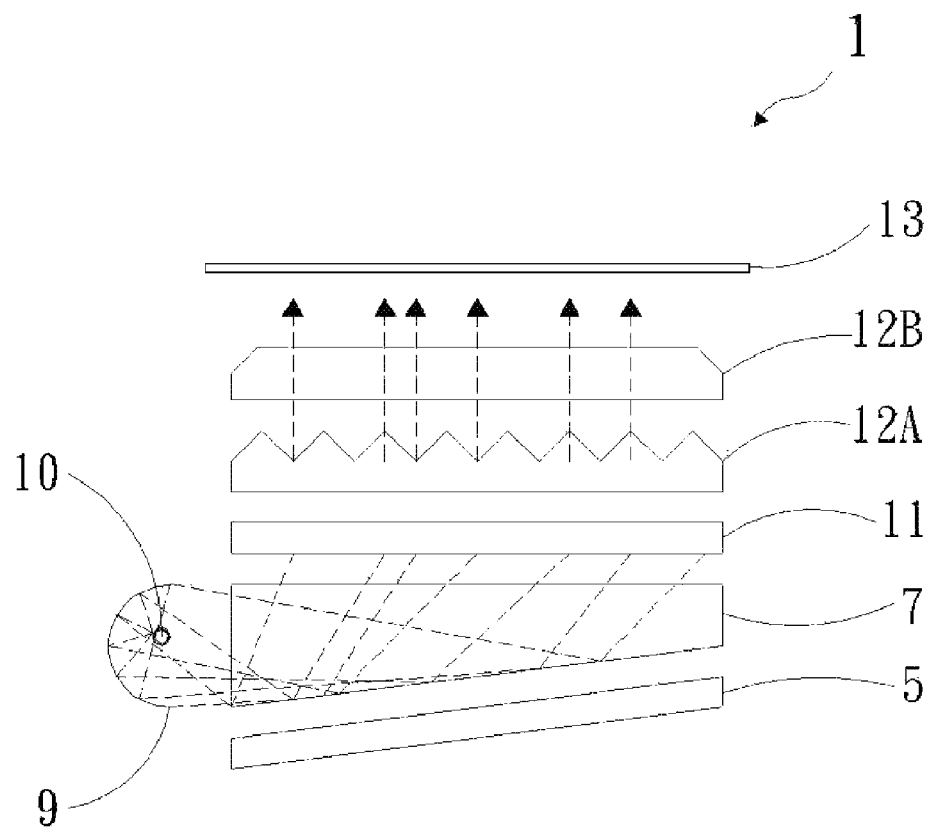
FIG. 1 illustrates a side view showing a conventional back light structure.
Figure 2:
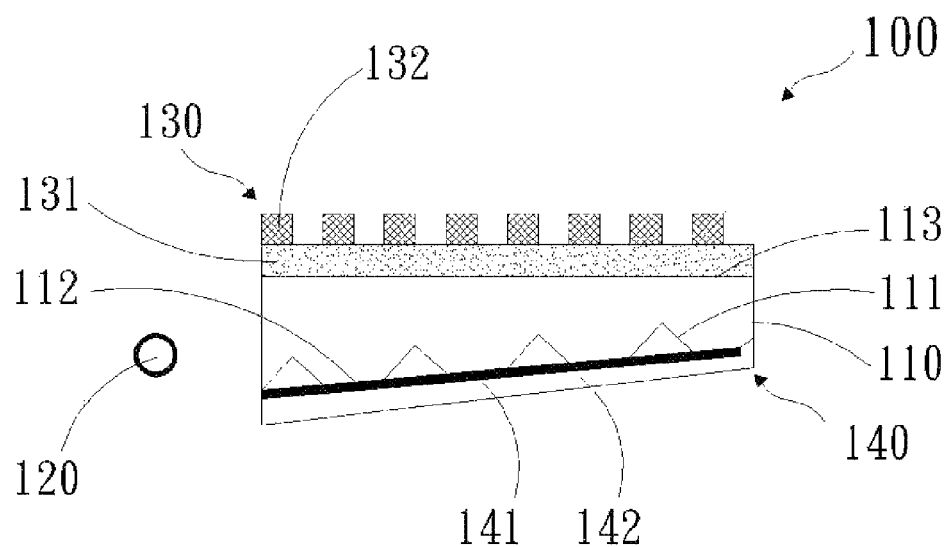
FIG. 2 illustrates a side view showing a microstructural polarized light-guide device according to a preferred embodiment of the present invention.

With reference to FIG. 2, a microstructural polarized light-guide device 100 comprises a light-guide plate 110, a CCFL 120, a polarization beam splitter structure 130 and a polarization conversion module 140.

The CCFL 120 is placed at the edge of the light-guide plate 110 and as the light source for the light-guide plate 110; in addition, the light source can be CCFL, LED or any other types of light emitting devices.

The light-guide plate 110 is PMMA with the characteristic of high transparency, the surface of the light-guide plate 110 has a plurality of extraction patterns 111, in addition, the plurality of extraction patterns 111 are integrated with the light-guide plate 110 and are able to be formed either V shapes, trapezoids, arcs or other shapes to enable the light-guide plate to produce light extraction with uniformity, in addition, the surface of the plurality of extraction patterns 111 is either a tilt plane 112 or a flat plane 113.

The polarization beam splitter structure 130 is disposed on the flat plane 113 opposite to the vicinal plane 112 of the light-guide plate 110; the polarization conversion module 140 is disposed on the vicinal plane 112 of the light-guide plate 110.

Figure 3:
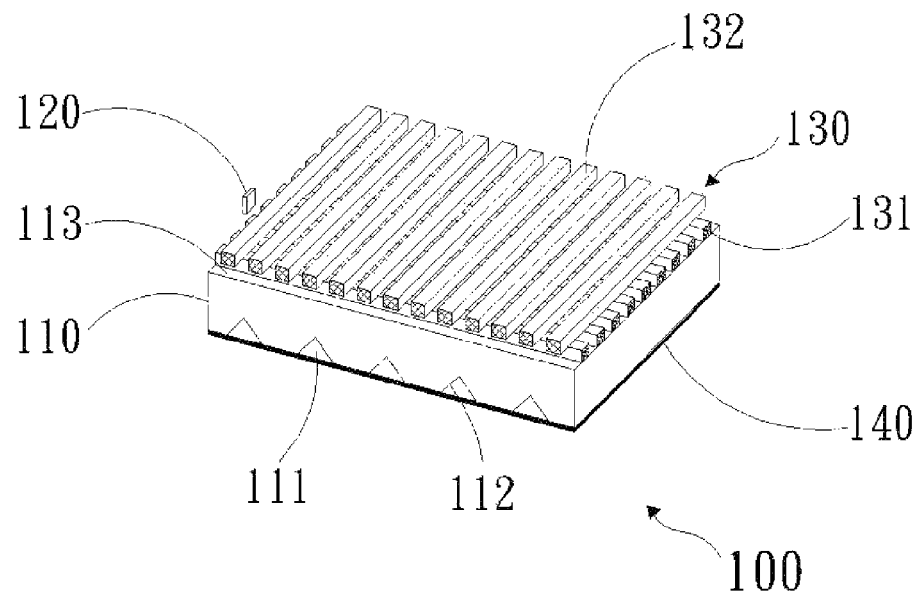
FIG. 3 illustrates a scheme view showing a first preferred embodiment of a microstructural polarized light-guide device according to the present invention.

The polarization beam splitter structure 130 is a nano-scale structure, as shown in FIG. 3 that the polarization beam splitter structure 130 comprises a dielectric nanograting layer 131 and a metallic nanograting layer 132; both of the dielectric nanograting layer 131 and the metallic nanograting layer 132 are sub-wavelength gratings, the periods are shorter than incident wavelength; the dielectric nanograting layer 131 and the light-guide plate 110 are both strip-shaped structures and integrated; the flat plane 113 on the light-guide plate 110 is made of the same material as the light-guide plate 110, either PMMA, glass or any other material with the characteristic of high transparency; the metallic nanograting layer 132 is formed on the dielectric nanograting layer 131, in addition, the metallic nanograting layer 132 and the dielectric nanograting layer 131 are vertically stacked with each other, the metallic nanograting layer 132 is composed of metal, such as aluminum, gold, silver, copper or tungsten.

Figure 4:
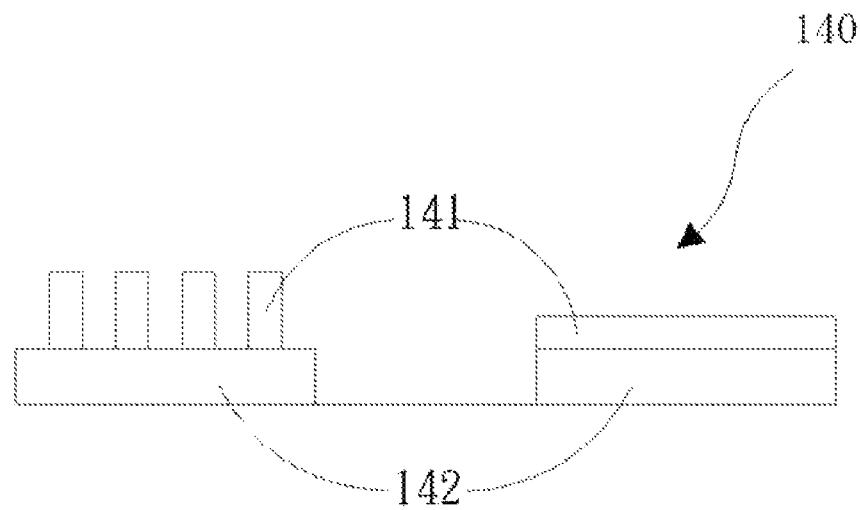
FIG. 4 is a perspective view showing a polarization conversion module of the microstructural polarized light-guide device according to the present invention.
Figure 5:
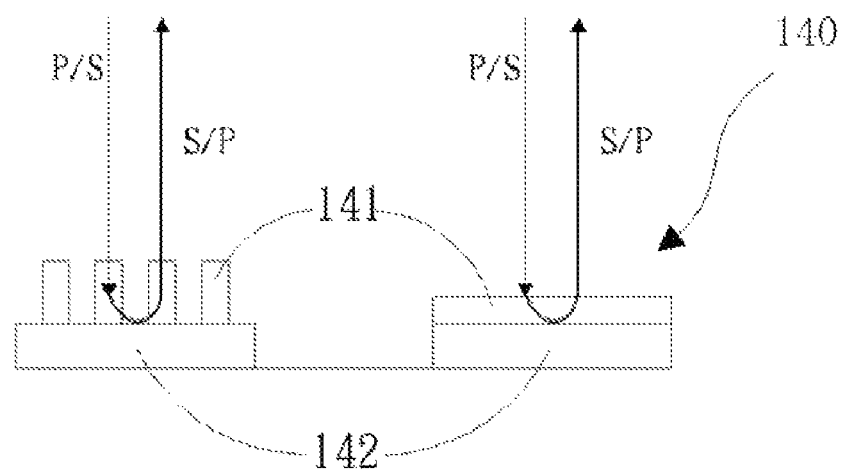
FIG. 5 is a perspective view showing the application of the polarization conversion module of the microstructural polarized light-guide device according to the present invention.

With reference to FIG. 2, the polarization conversion module 140 is disposed on the tilt plane 112 of the light-guide plate 110; the polarization conversion module 140 is composed of a polarization converter element 141 and a reflective film 142, the polarization converter element 141 is attached to the tilt plane 112 of the light-guide plate 110. With reference to FIG. 4, the polarization converter element 141 of the polarization conversion module 140 is either a nano-scale dielectric structure or an optical phase retarder; the reflective film 142 is placed on the external surface of the polarization converter element 141. With reference to FIG. 5, the polarization converter element 141 and the reflective film 142 of the polarization conversion module 140 can convert the polarization of light by refection, i.e., P-polarized light to be converted into S-polarized light and S-polarized light to be converted into P-polarized light.

Figure 6:
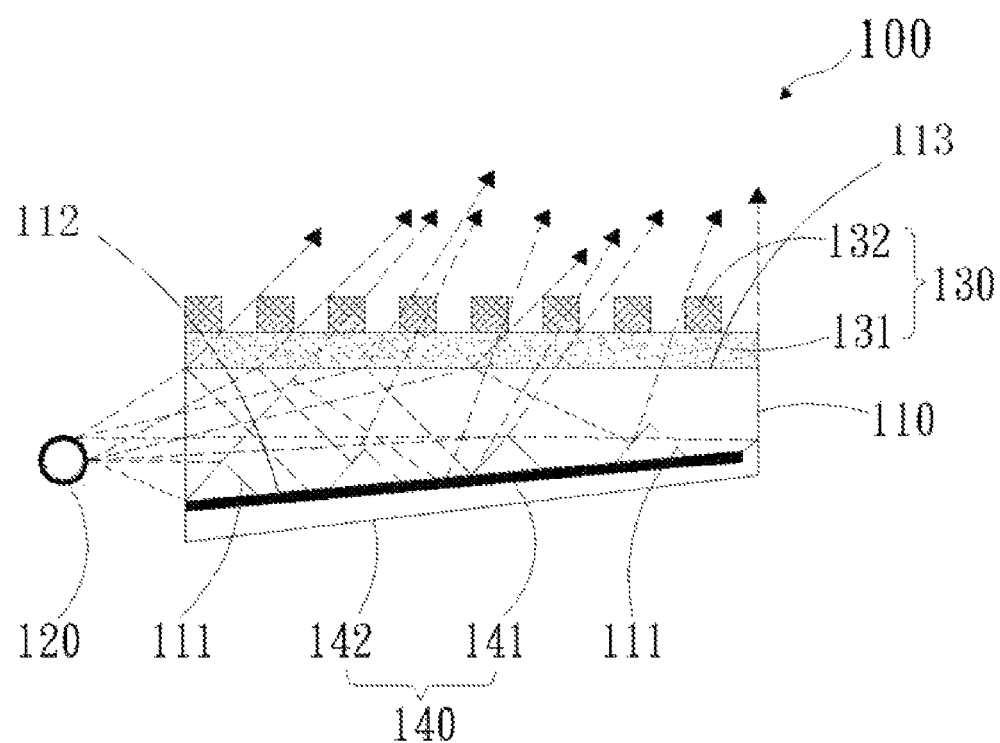
FIG. 6 illustrates the application of the microstructural polarized light-guide device according to a preferred embodiment of the present invention.

With reference to FIG. 6, the CCFL 120 of the microstructural polarized light-guide device 100 allows the light to be incident from the edge towards the light-guide plate 110, the PMMA material of the light-guide plate allows the incident light to form a uniform illumination through the extraction patterns 111 of the light-guide plate 110 by multiple reflection and scattering, the rays emerge from the light guide are formed as the polarized light through the dielectric nanograting layer 131 and the metallic nanograting layer 132 of the polarization beam splitter structure 130, which is a nano-scale structure disposed on the flat plane 113 of the light-guide plate 110.

The polarization conversion module 140 disposed on the tilt plane 112 of the light-guide plate 110 enables the microstructural polarization converter element 141 and the reflective film 142 to convert the light beams that are reflected from the polarization beam splitter structure 130 of the light-guide plate 110 into polarized light output, so as to reduce light energy loss and increase the quantity of the polarized light.

Figure 7:
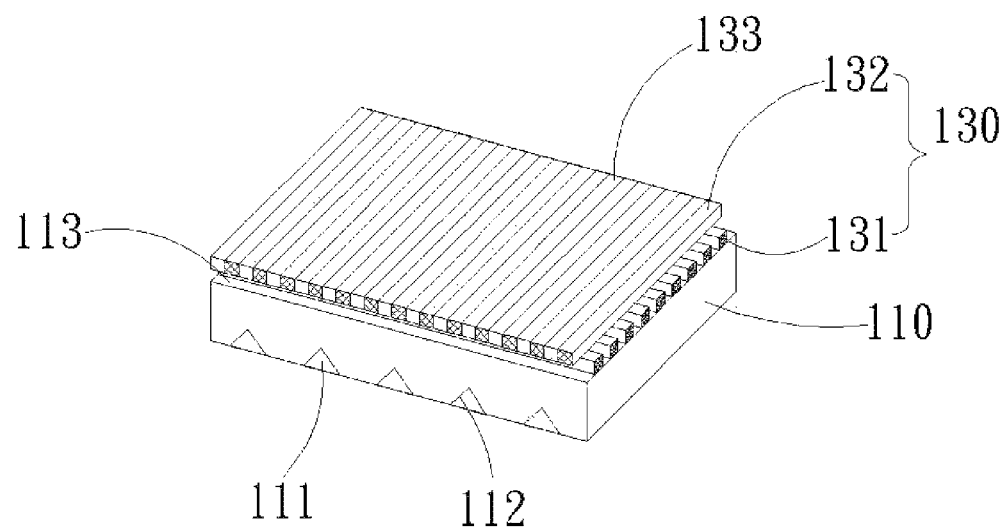
FIG. 7 is a perspective view showing a second embodiment of a microstructural polarized light-guide device according to the present invention.
Figure 8:
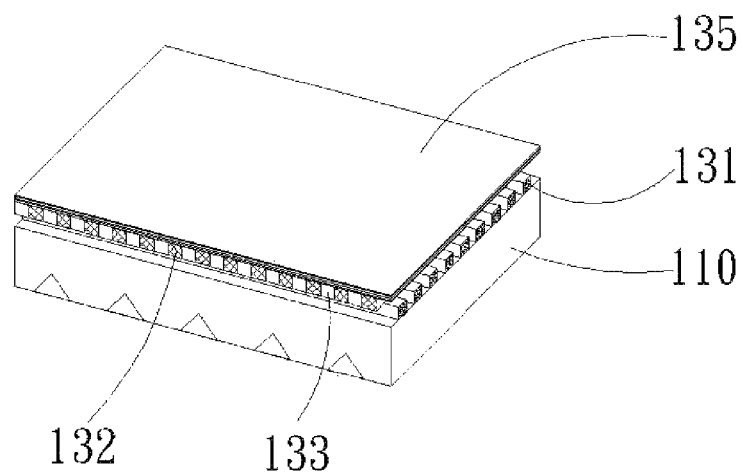
FIG. 8 is a perspective view showing a third embodiment of a microstructural polarized light-guide device according to the present invention.

FIG. 7 and FIG. 8 respectively illustrate the second and the third preferred embodiments of the microstructural polarized light-guide device according to the present invention. As shown in FIG. 7, the polarization beam splitter structure 130 is composed of the dielectric nanograting layer 131 and the metallic nanograting layer 132; the metallic nanograting layer 132 is formed on the dielectric nanograting layer 131 and both of the metallic nanograting layer 132 and the dielectric nanograting layer 131 are vertically stacked with each other; moreover, the strip-shaped metallic nanograting layer 132 is embedded in a plurality of strip-shaped dielectric structures 133 side by side.

As shown in FIG. 8, the polarization beam splitter structure 130 is composed of the dielectric nanograting layer 131 and the metallic nanograting layer 132; the strip-shaped metallic nanograting layer 132 is embedded in a plurality of the strip-shaped dielectric structures 133 side by side, in addition, a dielectric layer 135 as a protection layer on the top of the metallic nanograting layer 132, the material of the dielectric layer 135 applies either the same PMMA, glass or any other material with the characteristic of high transparency, to improve the optical efficiency of the light-guide device 100; consequently, to meet the requirements of the high luminance, the uniformity of TFT color LCD.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A microstructural polarized light-guide device, comprising:
    a unpolarized light source module, further comprising:
        a light-guide plate, which is PMMA (polymethylmethacrylate) with the characteristic of high transparency, the surface of the light-guide plate has a plurality of extraction patterns; and
        a light source, beside the light-guide plate;
    a subwavelength polarization beam splitter structure, which is a nano-scale structure and is disposed on a surface opposite to the surface with the plurality of extraction patterns of the light-guide plate, further comprising:
        a dielectric nanograting layer, which is a strip-shaped structure formed on a surface opposite to the surface with the plurality of extraction patterns of the light-guide plate, in addition, being integrated with the light-guide plate; and
        a metallic nanograting layer, which is a strip-shaped structure formed on the dielectric nanograting layer and vertically stacked with the dielectric nanograting layer; and
    a polarization conversion module, which is disposed on the surface with the plurality of extraction patterns of the light-guide plate.

2. The microstructural polarized light-guide device according to claim 1, wherein the surface with the plurality of extraction patterns of the light-guide plate is selected from the group consisting of: a tilt plane and a flat plane.

3. The microstructural polarized light-guide device according to claim 1, wherein the light source is selected from the group consisting of: a CCFL and an LED device.

4. The microstructural polarized light-guide device according to claim 1, wherein the dielectric nanograting layer of the polarization beam splitter structure is selected from the group consisting of: PMMA, glass and materials with the characteristic of high transparency.

5. The microstructural polarized light-guide device according to claim 1, wherein the metallic nanograting layer of the polarization beam splitter structure is composed by the group consisting of: aluminum, gold, silver, copper, and tungsten.

6. The microstructural polarized light-guide device according to claim 1, wherein the metallic nanograting layer of the polarization beam splitter structure is a strip-shaped structure, embedded in a plurality of strip-shaped dielectric structures side by side.

7. The microstructural polarized light-guide device according to claim 6, wherein the plurality of strip-shaped dielectric structures are selected from the group consisting of: PMMA, glass and materials with the characteristic of high transparency.

8. The microstructural polarized light-guide device according to claim 6, wherein a dielectric is on the top of the metallic nanograting layer.

9. The microstructural polarized light-guide device according to claim 8, wherein the dielectric layer is made by one of the group consisting of: PMMA, glass and materials with the characteristic of high transparency.

10. The microstructural polarized light-guide device according to claim 1, wherein the periods of the dielectric nanograting layer and the metallic nanograting layer of the polarization beam splitter structure are both shorter than incident wavelength.

11. The microstructural polarized light-guide device according to claim 1, wherein the polarization conversion module further comprises a polarization converter element and a reflective film, the polarization converter element being disposed on the bottom surface of the extraction patterns of the light-guide plate, the reflective film being attached to the external surface of the polarization converter element.

12. The microstructural polarized light-guide device according to claim 11, wherein the polarization converter element of the polarization conversion module is selected from the group consisting of: a nano-scale dielectric structure and an optical phase retarder.

* * * * *